(12) United States Patent
Hong et al.

(10) Patent No.: US 12,136,818 B2
(45) Date of Patent: Nov. 5, 2024

(54) THERMAL POWER UNIT-FLYWHEEL ENERGY STORAGE COOPERATIVE FREQUENCY REGULATION CONTROL METHOD AND SYSTEM

(71) Applicant: NORTH CHINA ELECTRIC POWER UNIVERSITY, Beijing (CN)

(72) Inventors: Feng Hong, Beijing (CN); Lu Liang, Beijing (CN); Xinyi Jia, Beijing (CN); Junhong Hao, Beijing (CN); Yanjun Du, Beijing (CN); Wei Wang, Beijing (CN); Fang Fang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 38 days.

(21) Appl. No.: 18/334,153

(22) Filed: Jun. 13, 2023

(65) Prior Publication Data
US 2023/0411964 A1 Dec. 21, 2023

(30) Foreign Application Priority Data

Jun. 14, 2022 (CN) .......................... 202210672280.5

(51) Int. Cl.
*H02J 3/30* (2006.01)
*H02J 3/24* (2006.01)

(52) U.S. Cl.
CPC .................. *H02J 3/30* (2013.01); *H02J 3/24* (2013.01); *H02J 2203/20* (2020.01)

(58) Field of Classification Search
CPC .. H02J 3/30; H02J 3/24; H02J 2203/20; H02J 3/28; H02J 3/32; H02J 3/241; H02J 3/466; H02J 7/0048; H02J 15/007; Y02E 60/16; Y02E 70/30
See application file for complete search history.

(56) References Cited

U.S. PATENT DOCUMENTS

| 2011/0074151 A1* | 3/2011 | Burra | H02J 3/241 290/44 |
| 2011/0089693 A1* | 4/2011 | Nasiri | F03D 7/0272 290/44 |
| 2015/0381089 A1* | 12/2015 | Tarnowski | H02J 3/32 290/44 |

* cited by examiner

*Primary Examiner* — Lincoln D Donovan
*Assistant Examiner* — Alex W Lam
(74) *Attorney, Agent, or Firm* — Fabian VanCott; Steven L. Nichols

(57) ABSTRACT

A thermal power unit-flywheel energy storage cooperative frequency regulation control method and system is provided, which belongs to the technical field of a power grid. First, a real-time output increment of a thermal power unit is predicted, then a real-time frequency regulation power instruction of a flywheel energy storage system is determined based on the predicted real-time output increment of the thermal power unit, and finally the frequency regulation power instruction of the thermal power unit is determined by a difference adjustment coefficient of a governor and a grid frequency deviation. The thermal power unit and flywheel energy storage system is cooperatively controlled by frequency regulation based on the real-time output increment predicted value of the unit, which realizes self-adaptive adjustment of output of the flywheel energy storage system under dynamic working conditions, and improves the grid frequency stability and operation safety of the thermal power unit.

8 Claims, 4 Drawing Sheets

THERMAL POWER UNIT-FLYWHEEL ENERGY STORAGE COOPERATIVE FREQUENCY REGULATION CONTROL METHOD AND SYSTEM

CROSS-REFERENCE TO RELATED APPLICATION

This patent application claims the benefit and priority of Chinese Patent Application 202210672280.5 filed with the China National Intellectual Property Administration on Jun. 14, 2022, the disclosure of which is incorporated by reference herein in its entirety as part of the present application.

TECHNICAL FIELD

The present disclosure relates to the field of power grids, in particular to a thermal power unit-flywheel energy storage cooperative frequency regulation control method and system.

BACKGROUND

With the large-scale grid connection of new energy sources such as wind power and photovoltaic, by the end of 2021, China's installed capacity of power generation was about 2.38 billion kW, increased by 7.9% year-on-year. The installed capacities of wind power and solar energy were about 330 million kW and 310 million kW, increased by 16.6% and 20.9% year-on-year, respectively. Due to intermittence and uncertainty inherent to new energy sources, the frequency security of power grid operation is facing a severe challenge, which requires a traditional coal-fired thermal power unit to undertake more tasks in frequency regulation of the power grid. A coal or fossil fuel burning electricity generation system will be referred to herein as a thermal power unit.

With the large-scale grid connection of volatile new energy sources such as wind power and photovoltaic, the requirements in power grid for peak regulation and frequency regulation of the thermal power unit are constantly increasing, which is manifested in the complexity of automatic generation control (AGC) instructions received by the thermal power unit. AGC instructions of a power plant in one day are counted, the AGC instruction changed 519 times in total, once every 2.8 minutes on average, and the maximum value of the change reaches 9% of a rated load; during the change of AGC instruction, the primary frequency regulation instruction acts 20 times. It can be seen that the AGC instruction fluctuates frequently, while the primary frequency regulation instruction has a strong randomness. When the power grid frequency deviates, the thermal power unit may be under different dynamic working conditions. The response capability of primary frequency regulation is affected by the current energy storage of the unit, and there is a significant gap between actual frequency regulation output of the thermal power unit and a steady-state working condition under the same valve instruction action.

Flexible transformation and coupling of multiple energy storage technologies for thermal power units is one of the important ways to enhance flexible regulation capability and frequency stability of the power system. Compared with traditional electrochemical energy storage, flywheel energy storage has many advantages such as precise response, long life, good safety, and more charge and discharge times, and has attracted extensive attention in the field of energy storage system assisting in power grid frequency regulation. It is of great significance to study the frequency regulation control of flywheel energy storage system in coordination with the thermal power unit.

The effectiveness of flywheel energy storage in assisting the thermal power unit to participate in frequency regulation has been verified by many experts, but the current theoretical research and field application have the following deficiencies:

1) The frequency regulation output strategy of the flywheel energy storage system generally adopts virtual droop control, which ignores the real-time state of the thermal power unit. Under dynamic working conditions, the flywheel cannot adjust its output in time to stabilize the frequency deviation of the power grid;
2) Most of the research on the frequency regulation performance of a thermal power unit are carried out under the steady-state working conditions of the thermal power unit, which cannot represent the actual continuous operation process, and the performance evaluation is mostly based on the identification and analysis of post-event data, which does not have real-time performance.

In view of the above problems, it is an urgent problem to be solved at present to establish a real-time output increment prediction model of the unit under dynamic working conditions, which quantitatively analyzes the output increment of the unit during the dynamic process of frequency regulation.

SUMMARY

An objective of embodiments of the present disclosure is to provide a thermal power unit-flywheel energy storage cooperative frequency regulation control method and system, so as to realize self-adaptive adjustment of output of the flywheel energy storage system under dynamic working conditions.

To achieve the above objective, the present disclosure provides the following technical solutions.

A thermal power unit-flywheel energy storage cooperative frequency regulation control method, including:
  obtaining a real-time operating parameter of a thermal power unit, a difference adjustment coefficient of a governor, a grid frequency deviation, a current state of charge of an energy storage battery and a rated power of an energy storage system;
  obtaining a predicted value of an output power increment of the thermal power unit by using a dynamic model of the thermal power unit according to the real-time operating parameter of the thermal power unit;
  determining an initial power instruction of the flywheel energy storage system according to the predicted value of the output power increment of the thermal power unit, the difference adjustment coefficient of the governor and the grid frequency deviation;
  obtaining a real-time maximum discharge power of the flywheel energy storage system by using a Logistic regression function according to the current state of charge of the energy storage battery and the rated power of the energy storage system;
  selecting a minimum value between a real-time maximum discharge power of the flywheel energy storage system and the initial power instruction of the flywheel energy storage system as a real-time frequency regulation power instruction of the flywheel energy storage system, and sending it to the flywheel energy storage system;

determining a frequency regulation power instruction of the thermal power unit according to the difference adjustment coefficient of the governor and the grid frequency deviation, and sending it to the thermal power unit.

Optionally, obtaining a predicted value of an output power increment of the thermal power unit by using a dynamic model of the thermal power unit according to the real-time operating parameter of the thermal power unit, specifically includes:

building a dynamic model of the thermal power unit; where the dynamic model of the thermal power unit includes a boiler dynamic model and a steam turbine dynamic model;

obtaining a predicted value of a main steam flow increment by using a formula $$\Delta D_t = K_6 \left( \int u_t dp_t + \int p_t du_t \right) = K_6 \int \left( u_t \frac{dp_t}{dt} + p_t \frac{du_t}{dt} \right) dt$$

based on the boiler dynamic model and according to the real-time operating parameter of the thermal power unit; where $\Delta D_t$ is the predicted value of the main steam flow increment at time t, $K_6$ is an internal balance coefficient of a simulation model, $u_t$ is a valve opening at time t, $p_t$ is a main steam pressure of the thermal power unit at time t;

inputting the predicted value of the main steam flow increment into the steam turbine dynamic model, and obtaining the predicted value of the output power increment of the thermal power unit by using a formula $$\Delta N_p = \frac{1 + s\lambda T_{RH} F_{HP} + s T_{RH} F_{HP}}{(1 + s T_{SC})(1 + s T_{RH})} \Delta D_t;$$

where $\Delta N_p$ is the predicted value of the output power increment of the thermal power unit, $\lambda$ is an over regulation coefficient of a high-pressure cylinder, $T_{RH}$ is a volume-time constant for medium-pressure steam, $F_{HP}$ is a power coefficient of the high-pressure cylinder, $T_{SC}$ is a volume-time constant for high-pressure steam, $T_{RH}$ is a volume-time constant for medium-pressure steam, and s is a Laplace operator.

Optionally, determining an initial power instruction of the flywheel energy storage system according to the predicted value of the output power increment of the thermal power unit, the difference adjustment coefficient of the governor and the grid frequency deviation, specifically includes:

determining a compensation amount of the flywheel to compensate for output loss of the thermal power unit by using a formula $$\Delta N = -\frac{1}{R}\Delta f - \Delta N_p$$

according to the predicted value of the output power increment of the thermal power unit, the difference adjustment coefficient of the governor and the grid frequency deviation; where $\Delta N$ is the compensation amount of the flywheel to compensate for the output loss of the thermal power unit, R is the difference adjustment coefficient of the governor, and $\Delta f$ is the grid frequency deviation;

determining a droop control output of the flywheel as a function of the grid frequency deviation by using a formula $N_s = -K_f \Delta f$ according with the grid frequency deviation; where $N_s$ s is the droop control output of the flywheel as a function of the grid frequency deviation, and $K_f$ is a droop control coefficient of the flywheel energy storage system;

determining a sum of the compensation amount of the flywheel to compensate for the output loss of the thermal power unit and the droop control output of the flywheel as a function of the grid frequency deviation as the initial power instruction of the flywheel energy storage system.

Optionally, obtaining a real-time maximum discharge power of the flywheel energy storage system by using a Logistic regression function according to the current state of charge of the energy storage battery and the rated power of the energy storage system, specifically includes:

determining the real-time maximum discharge power of the flywheel energy storage system by using a formula $$N_d(t) = \frac{KP_m P \times e^{\frac{r \times (SOC - SOC_{min})}{b}}}{K + P_0 \times e^{\frac{r \times (SOC - SOC_{min})}{b}}}$$

according to the current state of charge of the energy storage battery and the rated power of the energy storage system;

where $N_d$ (t) is a maximum discharge power of the flywheel energy storage system at time t, $P_m$ is the rated power of the energy storage system, SOC is the current state of charge of the energy storage system, and $SOC_{min}$ is a minimum state of charge allowed by the energy storage system, K, P, $P_0$, b and r are the first, second, third, fourth, and fifth characteristic parameters of the Logistic regression function respectively.

As used herein, the term "module" may refer to a logic circuit, including an Applicant Specific Integrated Circuit (ASIC), structured to perform a specific function, for example, see the circuitry shown in FIGS. 2-4. Alternatively, a "module" may include a processor or number of processors programmed to perform the specific function as part of the control system.

A thermal power unit-flywheel energy storage cooperative frequency regulation control system, including:

a parameter obtaining module configured to obtain a real-time operating parameter of a thermal power unit, a difference adjustment coefficient of a governor, a grid frequency deviation, a current state of charge of an energy storage battery and a rated power of the energy storage system;

an increment prediction module configured to obtain a predicted value of an output power increment of the thermal power unit by using a dynamic model of the thermal power unit according to the real-time operating parameter of the thermal power unit;

an initial power instruction determining module configured to determine an initial power instruction of the flywheel energy storage system according to the predicted value of the output power increment of the thermal power unit, the difference adjustment coefficient of the governor and the grid frequency deviation;

a real-time maximum discharge power obtaining module configured to obtain a real-time maximum discharge power of the flywheel energy storage system by using a Logistic regression function according to the current state of charge of the energy storage battery and the rated power of the energy storage system;

a flywheel real-time frequency regulation power instruction sending module configured to select a minimum value between a real-time maximum discharge power of the flywheel energy storage system and the initial power instruction of the flywheel energy storage system as a real-time frequency regulation power instruction of the flywheel energy storage system, and send it to the flywheel energy storage system;

a thermal power unit frequency regulation power instruction sending module configured to determine a frequency regulation power instruction of the thermal power unit according to the difference adjustment coefficient of the governor and the grid frequency deviation, and send it to the thermal power unit.

Optionally, the increment prediction module specifically includes:

a thermal power unit dynamic model building submodule configured to build a dynamic model of the thermal power unit; where the dynamic model of the thermal power unit includes a boiler dynamic model and a steam turbine dynamic model;

a main steam flow increment predicted value obtaining sub-module configured to obtaining a predicted value of a main steam flow increment by using a formula $$\Delta D_t = K_6 \left( \int u_t dp_t + \int p_t du_t \right) = K_6 \int \left( u_t \frac{dp_t}{dt} + p_t \frac{du_t}{dt} \right) dt$$

based on the boiler dynamic model and according to the real-time operating parameter of the thermal power unit; where $\Delta D_t$ is the predicted value of the main steam flow increment at time t, $K_6$ is an internal balance coefficient of a simulation model, $u_t$ is a valve opening at time t, $p_t$ is a main steam pressure of the thermal power unit at time t;

a power increment prediction sub-module configured to input the predicted value of the main steam flow increment into the steam turbine dynamic model, and obtain the predicted value of the output power increment of the thermal power unit by using a formula $$\Delta N_p = \frac{1 + s\lambda T_{RH} F_{HP} + s T_{RH} F_{HP}}{(1 + s T_{SC})(1 + s T_{RH})} \Delta D_t;$$

where $\Delta N_p$ is the predicted value of the output power increment of the thermal power unit, $\lambda$ is an over regulation coefficient of a high-pressure cylinder, $T_{RH}$ is a volume-time constant for medium-pressure steam, $F_{HP}$ is a power coefficient of the high-pressure cylinder, $T_{SC}$ is a volume-time constant for high-pressure steam, $T_{RH}$ is a volume-time constant for medium-pressure steam, and s is a Laplace operator.

Optionally, the initial power instruction determining module specifically includes:

a compensation amount determining sub-module configured to determine a compensation amount of the flywheel to compensate for output loss of the thermal power unit by using a formula $$\Delta N = -\frac{1}{R}\Delta f - \Delta N_p$$

according to the predicted value of the output power increment of the thermal power unit, the difference adjustment coefficient of the governor and the grid frequency deviation; where $\Delta N$ is the compensation amount of the flywheel to compensate for the output loss of the thermal power unit, R is the difference adjustment coefficient of the governor, and $\Delta f$ is the grid frequency deviation;

a droop control output determining sub-module configured to determine a droop control output of the flywheel as a function of the grid frequency deviation by using a formula $N_s = -K_f \Delta f$ according with the grid frequency deviation; where $N_s$ is the droop control output of the flywheel as a function of the grid frequency deviation, and $K_f$ is a droop control coefficient of the flywheel energy storage system;

a summation sub-module configured to determine a sum of the compensation amount of the flywheel to compensate for the output loss of the thermal power unit and the droop control output of the flywheel as a function of the grid frequency deviation as the initial power instruction of the flywheel energy storage system.

Optionally, the real-time maximum discharge power obtaining module specifically includes:

a real-time maximum discharge power determining sub-module configured to determine the real-time maximum discharge power of the flywheel energy storage system by using a formula $$N_d(t) = \frac{KP_m P \times e^{\frac{r \times (SOC - SOC_{min})}{b}}}{K + P_0 \times e^{\frac{r \times (SOC - SOC_{min})}{b}}}$$

according to the current state of charge of the energy storage battery and the rated power of the energy storage system;

where $N_d(t)$ is a maximum discharge power of the flywheel energy storage system at time t, $P_m$ is the rated power of the energy storage system, SOC is the current state of charge of the energy storage system, and $SOC_{min}$ is a minimum state of charge allowed by the energy storage system, K, P, $P_0$, b and r are the first, second, third, fourth, and fifth characteristic parameters of the Logistic regression function respectively.

According to the specific embodiments provided by the present disclosure, the present disclosure discloses the following technical effects.

The present disclosure discloses a thermal power unit-flywheel energy storage cooperative frequency regulation control method and system. First, a real-time output increment of the thermal power unit is predicted, then the real-time frequency regulation power instruction of the flywheel energy storage system is determined based on the predicted real-time output increment of the thermal power unit, and finally the frequency regulation power instruction of the thermal power unit is determined by the difference adjustment coefficient of the governor and the grid frequency deviation. The thermal power unit and flywheel energy storage system is cooperatively controlled by frequency regulation based on the real-time output increment predicted value of the unit, which realizes the self-adaptive adjustment of the output of the flywheel energy storage system under dynamic working conditions, and improves the grid frequency stability and the operation safety of the thermal power unit.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of some embodiments of the present disclosure is to provide a thermal power unit-flywheel energy storage cooperative frequency regulation control method and system to realize self-adaptive adjustment of output of the flywheel energy storage system under dynamic working conditions.

To make the above objective, features, and advantages of the present disclosure more apparent and comprehensible, the present disclosure will be further described in detail below in conjunction with the accompanying drawings and specific embodiments.

Figure 1:
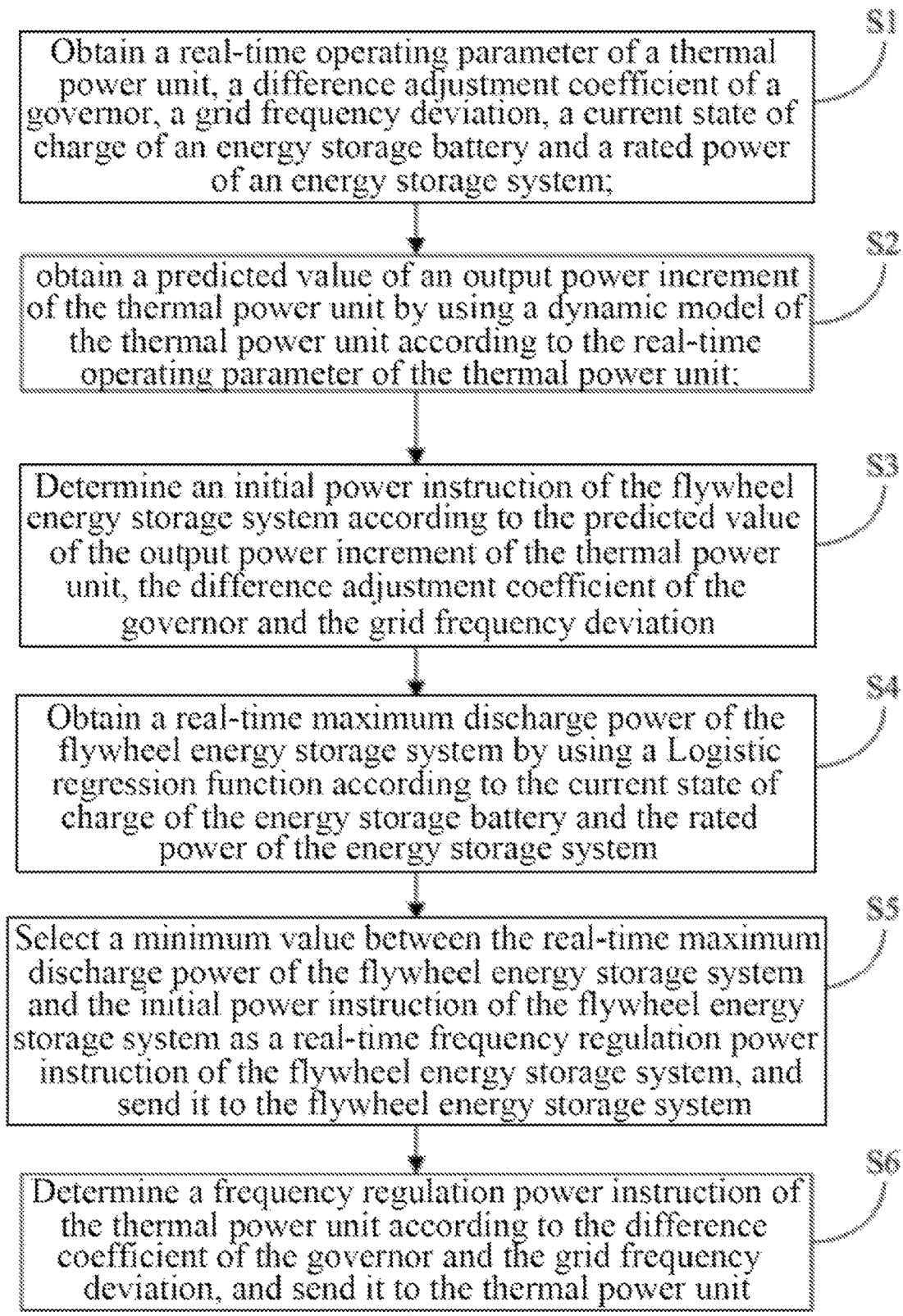
FIG. 1 is a flowchart of a thermal power unit-flywheel energy storage cooperative frequency regulation control method according to an embodiment of the present disclosure.
Figure 2:
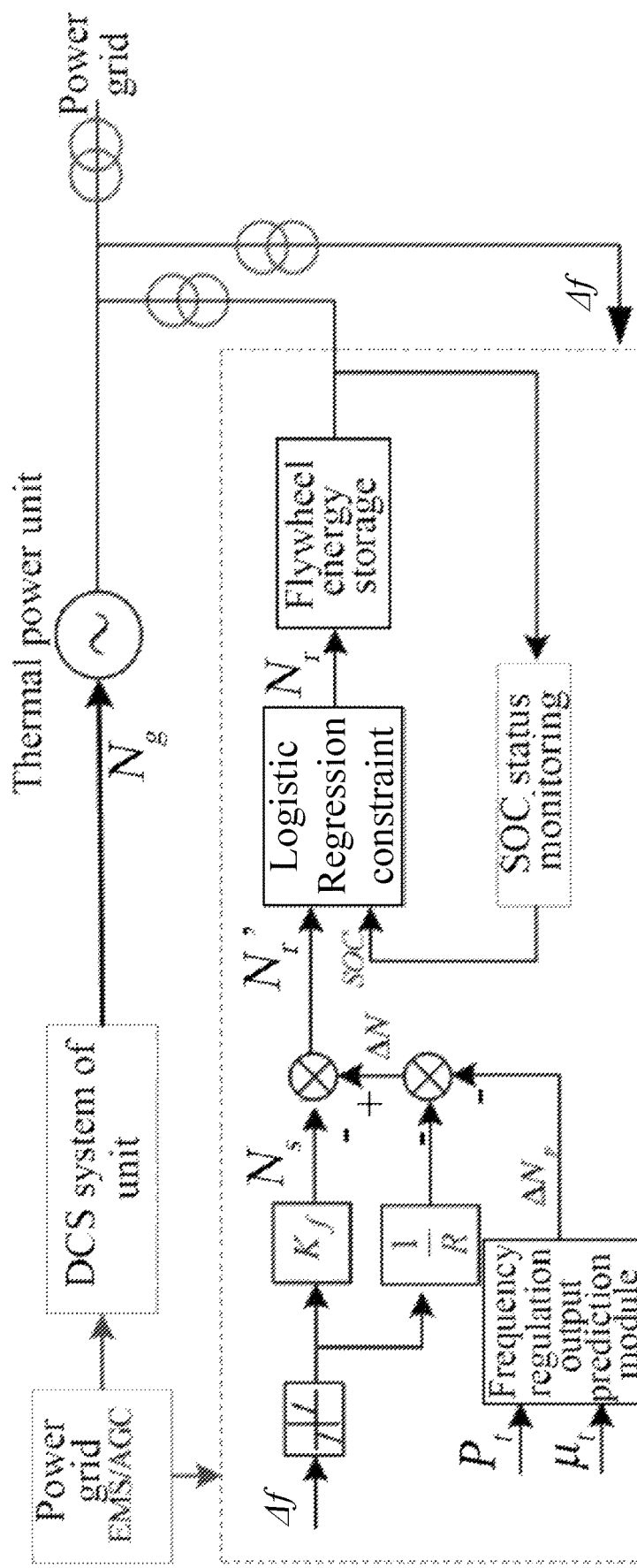
FIG. 2 is a principle framework diagram of the thermal power unit-flywheel energy storage cooperative frequency regulation control method according to an embodiment of the present disclosure.

In order to realize the self-adaptive adjustment of the output of the flywheel energy storage system under dynamic working conditions, and improve the grid frequency stability and the operation safety of the thermal power unit, the embodiments of the present disclosure provides a thermal power unit-flywheel energy storage cooperative frequency regulation control method based on a real-time output increment prediction of the unit, as shown in FIGS. 1-2, which includes steps S1-S6.

In step S1, a real-time operating parameter of the thermal power unit, a difference adjustment coefficient of a governor, a grid frequency deviation, a current state of charge of an energy storage battery and a rated power of an energy storage system are obtained.

The real-time operating parameters which are a main steam pressure $p_t$ and a valve opening $u_t$ are obtained by a distributed control system (DCS) of the thermal power unit. The difference adjustment coefficient R of the governor is obtained from a unit design manual. The current state of charge SOC of the energy storage battery (the value ranges from 0 to 1, indicating the current quantity of stored electricity of the energy storage system) and the rated power $P_m$ of the energy storage system are obtained by an energy storage management system. The grid frequency deviation $\Delta f$ is obtained by a grid frequency regulation system.

In step S2, a predicted value of an output power increment of the thermal power unit is obtained by using a dynamic model of the thermal power unit according to the real-time operating parameter of the thermal power unit.

(1) Building a Dynamic Model of the Thermal Power Unit

The dynamic model of the thermal power unit mainly includes a boiler dynamic model and a steam turbine dynamic model. The specific model structures are shown in FIGS. 3 and 4.

Figure 3:
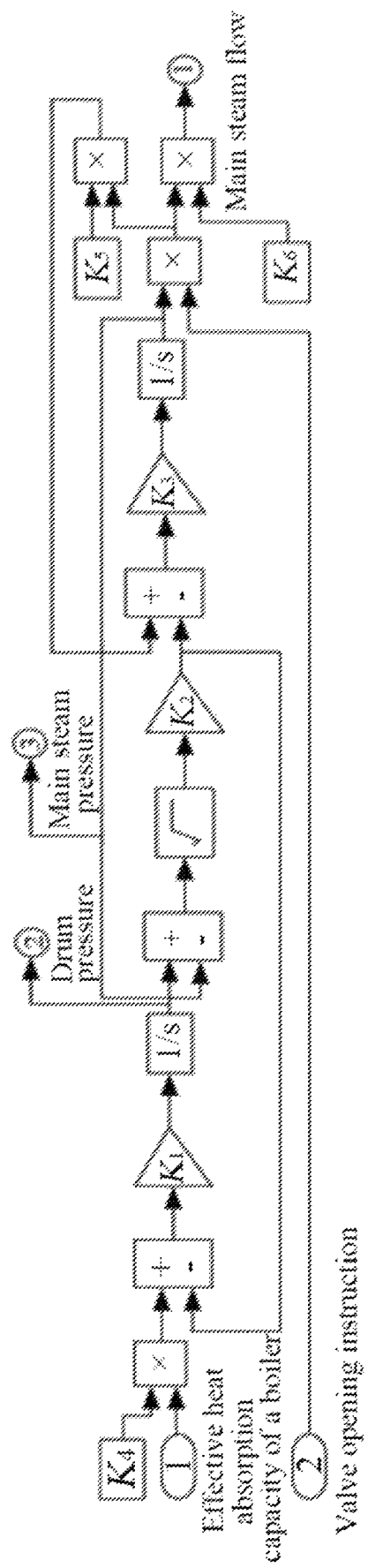
FIG. 3 is a schematic diagram of a boiler dynamic model according to an embodiment of the present disclosure.

FIG. 3 is a schematic diagram of the boiler dynamic model. In FIG. 3, $K_1$ is a reciprocal of heat storage coefficient of a steam drum; $K_3$ is a reciprocal of heat storage coefficient of a main steam pipe; $K_2$, $K_4$, $K_5$, and $K_6$ are internal balance coefficients of a simulation model. All the above parameters can be obtained from a historical data identification and a disturbance experiment of boiler operations. The identification method and the experimental method are common methods.

Figure 4:
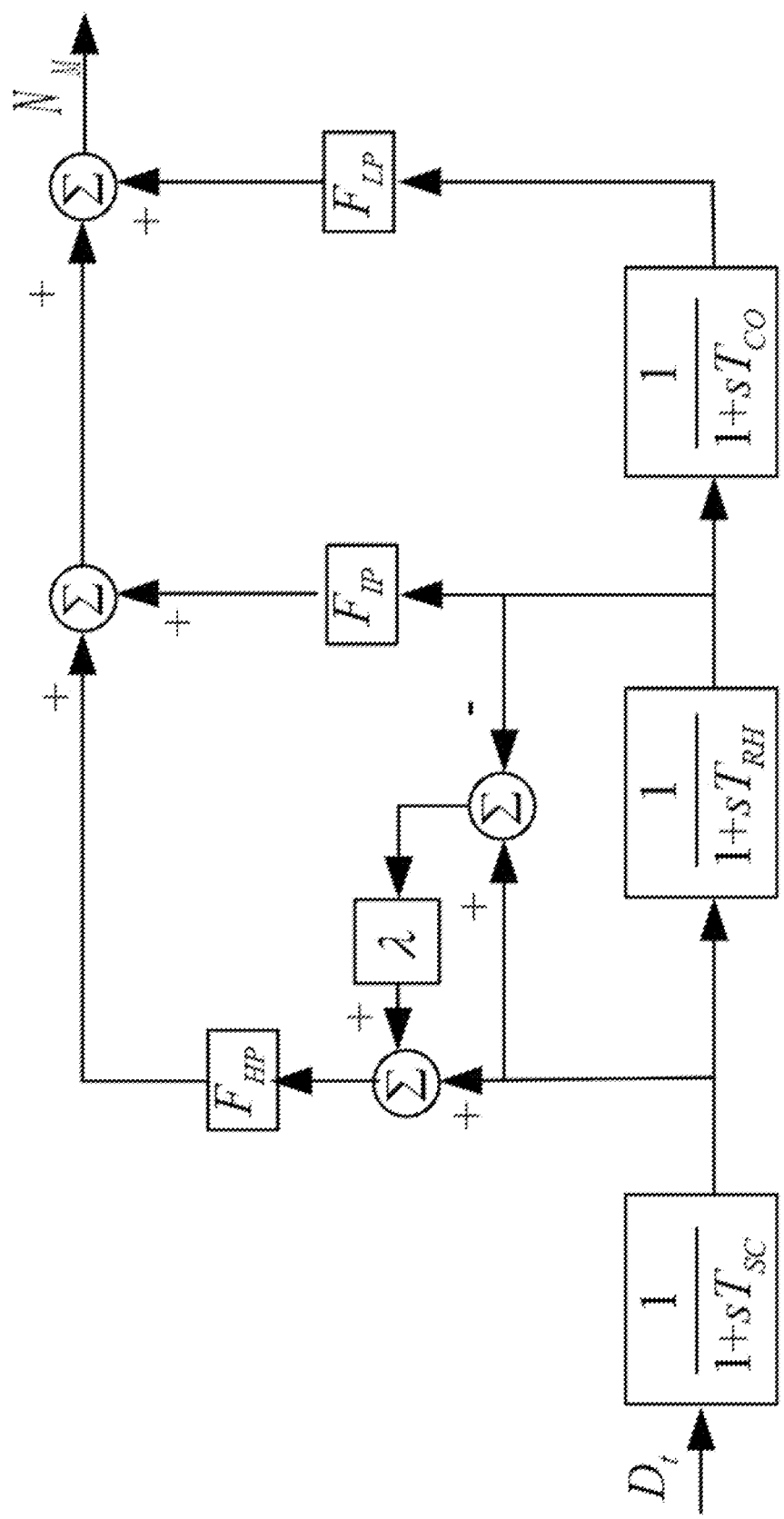
FIG. 4 is a schematic diagram of a steam turbine dynamic model according to an embodiment of the present disclosure.

FIG. 4 is a schematic diagram of the steam turbine dynamic model. In FIG. 4, $T_{SC}$ is a volume-time constant for high-pressure steam; $T_{RH}$ is a volume-time constant for medium-pressure steam; $T_{CO}$ is a volume-time constant for low-pressure steam; $F_{HP}$ is a power coefficient of a high-pressure cylinder; $F_{IP}$ is a power coefficient of a medium-pressure cylinder; $F_{LP}$ is a power coefficient of a low-pressure cylinder; and $\lambda$ is an over regulation coefficient of the high-pressure cylinder. All the above coefficients can be identified and calculated from the historical operating data of the thermal power unit. $D_t$ represents a main steam flow entering the steam turbine to do work; $N_M$ represents a mechanical power output by the steam turbine.

(2) Predicting Change of the Main Steam Flow Increment

The main steam pressure $p_t$ and the valve opening $u_t$ of the thermal power unit obtained in step S1 are combined with the boiler dynamic model built in step S2 to obtain a predicted value $\Delta_t$ of the main steam flow increment.

The specific calculation formula is as follows:

$$\Delta D_t = K_6 \left( \int u_t dp_t + \int p_t du_t \right) = K_6 \int \left( u_t \frac{dp_t}{dt} + p_t \frac{du_t}{dt} \right) dt$$

(3) Predicting Change of the Output Power Increment of the Thermal Power Unit

In combination with the established steam turbine model, a predicted value $\Delta N_p$ of the output power increment of the thermal power unit is obtained according to the predicted value of the main steam flow as an input of the steam turbine model:

$$\Delta N_p = \frac{1 + s\lambda T_{RH} F_{HP} + sT_{RH} F_{HP}}{(1 + sT_{SC})(1 + sT_{RH})} \Delta D_t$$

In step S3, an initial power instruction of the flywheel energy storage system is determined according to the predicted value of the output power increment of the thermal power unit, the difference adjustment coefficient of the governor and the grid frequency deviation.

The output of the flywheel includes two parts, one part is a droop control output $N_s$ as a function of the grid frequency deviation, and the other part is a compensation amount $\Delta N$ to compensate for the output loss of the thermal power unit. The output value of each part is calculated by the following two formulas:

$$N_s = -K_f \Delta f$$

$$\Delta N = -\frac{1}{R}\Delta f - \Delta N_p$$

where $K_f$ is a droop control coefficient of the flywheel energy storage system (it is artificially set according to the rated power capacity of the energy storage system, etc.).

The initial power instruction $N'_r$ of the flywheel energy storage system is obtained by the following formula:

$$N'_r = N_s + \Delta N$$

In step S4, according to the current state of charge of the energy storage battery and the rated power of the energy storage system, a real-time maximum discharge power of the flywheel energy storage system is obtained by using a Logistic regression function.

In order to avoid overcharging and over-discharging of the flywheel energy storage, smooth the energy storage output, and improve operating life of the energy storage, a Logistic regression function is introduced to constrain the maximum output of the flywheel energy storage in different SOC states. The maximum discharge power of the flywheel energy storage system at time t is shown in the following formula:

$$N_d(t) = \frac{KP_m P \times e^{\frac{r \times (SOC - SOC_{min})}{b}}}{K + P_0 \times e^{\frac{r \times (SOC - SOC_{min})}{b}}}$$

where $N_d(t)$ is a maximum discharge power of the flywheel energy storage system at time t, $P_m$ is the rated power of the energy storage system, SOC is the current state of charge of the energy storage system, and $SOC_{min}$ is a minimum state of charge allowed by the energy storage system, K, P, $P_0$, b and r are the first, second, third, fourth, and fifth characteristic parameters of the Logistic regression function respectively, and the specific values are shown in Table 1.

TABLE 1

Characteristic parameters of Logistic regression function

| Parameter | K | P | $P_0$ | b | r |
|---|---|---|---|---|---|
| Value | 6 | 1/600 | 0.01 | 0.4 | 13 |

In step S5, a minimum value between the real-time maximum discharge power of the flywheel energy storage system and the initial power instruction of the flywheel energy storage system is selected as real-time frequency regulation power instructions of the flywheel energy storage system, and is sent to the flywheel energy storage system.

Constrained by energy storage output, the frequency regulation power instruction $N_r$ finally sent to the flywheel energy storage system is as follows:

$$N_r = \min(N_{d(t)}, N'_r)$$

In step S6, according to the difference adjustment coefficient of the governor and the grid frequency deviation, a frequency regulation power instruction of the thermal power unit is determined, and sent to the thermal power unit.

The frequency regulation power instruction $N_g$ of the thermal power unit is obtained by the following formula:

$$N_g = -\frac{1}{R}\Delta f$$

where R is the difference adjustment coefficient of the governor.

In the present disclosure, a prediction model of the real-time output increment of the unit under dynamic working conditions is established to quantitatively analyze the output increment of the unit in the dynamic process of frequency regulation. On this basis, a thermal power unit-flywheel energy storage system cooperative frequency regulation control strategy based on real-time output increment prediction of the unit is provided, which can realize self-adaptive adjustment of the output of the flywheel energy storage system under dynamic working conditions and improve the grid frequency stability and the operation safety of the thermal power unit.

Compared with the virtual droop control of the traditional flywheel energy storage system, the thermal power unit-flywheel energy storage cooperative control strategy provided in the present disclosure has the following advantages:

1) In the design of flywheel operation control strategy, compared with the droop control, the improved fire-storage cooperative control strategy can reduce the maximum value of the system frequency deviation by 32%, and the steady-state deviation by about 30%, which is more conducive to the stable support of the system frequency.

2) When the external load is disturbed, participation of a flywheel energy storage auxiliary unit in frequency regulation can reduce the output power fluctuation of the steam turbine. Under the cooperative strategy, the peak output of the steam turbine is about 50% of the peak output of the original unit, which can effectively slow down output fluctuation of the thermal power unit, which is beneficial to recovery of energy storage of the unit and protection for the unit equipment.

3) The improved flywheel energy storage operation control strategy can effectively reduce the amplitude of main steam pressure fluctuation, avoid the unit operation and safety problems caused by excessive change of main steam pressure, ensure safe operation of the thermal power unit, and improve the life of the unit.

The embodiments of the present disclosure also provides a thermal power unit-flywheel energy storage cooperative frequency regulation control system, which includes a parameter obtaining module, an increment prediction module, an initial power instruction determining module, a real-time maximum discharge power obtaining module, a flywheel real-time frequency regulation power instruction sending module, and a thermal power unit frequency regulation power instruction sending module.

The parameter obtaining module is configured to obtain real-time operating parameters of the thermal power unit, a difference adjustment coefficient of a governor, a grid frequency deviation, a current state of charge of an energy storage battery and a rated power of the energy storage system.

The increment prediction module is configured to obtain a predicted value of output power increment of the thermal power unit by using the dynamic model of the thermal power unit according to the real-time operating parameter of the thermal power unit.

The initial power instruction determining module is configured to determine an initial power instruction of the flywheel energy storage system according to the predicted value of the output power increment of the thermal power unit, the difference adjustment coefficient of the governor and the grid frequency deviation.

The real-time maximum discharge power obtaining module is configured to obtain a real-time maximum discharge power of the flywheel energy storage system by using the Logistic regression function according to the current state of charge of the energy storage battery and the rated power of the energy storage system.

The flywheel real-time frequency regulation power instruction sending module is configured to select a minimum value between a real-time maximum discharge power of the flywheel energy storage system and the initial power instruction of the flywheel energy storage system as the real-time frequency regulation power instruction of the flywheel energy storage system, and send it to the flywheel energy storage system.

The thermal power unit frequency regulation power instruction sending module is configured to determine the frequency regulation power instruction of the thermal power unit according to the difference adjustment coefficient of the governor and the grid frequency deviation, and send it to the thermal power unit.

The increment prediction module specifically includes a thermal power unit dynamic model building sub-module, a main steam flow increment predicted value obtaining sub-module and a power increment prediction sub-module.

The thermal power unit dynamic model building sub-module is configured to build a thermal power unit dynamic model; the thermal power unit dynamic model includes a boiler dynamic model and a steam turbine dynamic model.

The main steam flow increment predicted value obtaining sub-module is configured to obtain a predicted value of a main steam flow increment based on the boiler dynamic model and according to the real-time operating parameter of the thermal power unit by using a formula $$\Delta D_t = K_6 \left( \int u_t dp_t + \int p_t du_t \right) = K_6 \int \left( u_t \frac{dp_t}{dt} + p_t \frac{du_t}{dt} \right) dt;$$

where $\Delta D_t$ is the predicted value of the main steam flow increment at time t, $K_6$ is an internal balance coefficient of a simulation model, $u_t$ is a valve opening at time t, and $p_t$ is a main steam pressure of the thermal power unit at time t.

The power increment prediction sub-module is configured to input the predicted value of the main steam flow increment into the steam turbine dynamic model, and obtain a predicted value of the output power increment of the thermal power unit by using a formula $$\Delta N_p = \frac{1 + s\lambda T_{RH} F_{HP} + s T_{RH} F_{HP}}{(1 + s T_{SC})(1 + s T_{RH})} \Delta D_t;$$

where $\Delta N_p$ is the predicted value of the output power increment of the thermal power unit, $\lambda$ is an over regulation coefficient of a high-pressure cylinder, $T_{RH}$ is a volume-time constant of medium-pressure steam, $F_{HP}$ is a power coefficient of a high-pressure cylinder, $T_{SC}$ is a volume-time constant of high-pressure steam, $T_{RH}$ is a volume-time constant of medium-pressure steam, and s is a Laplace operator.

The initial power instruction determining module specifically includes a compensation amount determining sub-module, a droop control output determining sub-module and a summation sub-module.

The compensation amount determining sub-module is configured to determine a compensation amount of the flywheel to compensate for output loss of the thermal power unit by using a formula $$\Delta N = -\frac{1}{R}\Delta f - \Delta N_p$$

according to the predicted value of the output power increment of the thermal power unit, the difference adjustment coefficient of the governor and the grid frequency deviation; where $\Delta N$ is the compensation amount of the flywheel to compensate for the output loss of the thermal power unit, R is the difference adjustment coefficient of the governor, and $\Delta f$ is the grid frequency deviation.

The droop control output determining sub-module is configured to determine a droop control output of the flywheel as a function of the grid frequency deviation by using a formula $N_s = -K_f \Delta f$ according to the grid frequency deviation; where $N_s$ s is the droop control output of the flywheel as a function of the grid frequency deviation, $K_f$ is a droop control coefficient of the flywheel energy storage system.

The summation sub-module is configured to determine a sum of the compensation amount of the flywheel to compensate for the output loss of the thermal power unit and the droop control output of the flywheel as a function of the grid frequency deviation, as the initial power instruction of the flywheel energy storage system.

The real-time maximum discharge power obtaining module includes a real-time maximum discharge power determining sub-module.

The real-time maximum discharge power determining sub-module is configured to determine a real-time maximum discharge power of the flywheel energy storage system by using a formula $$N_d(t) = \frac{KP_m P \times e^{\frac{r \times (SOC - SOC_{min})}{b}}}{K + P_0 \times e^{\frac{r \times (SOC - SOC_{min})}{b}}}$$

according to the current state of charge of the energy storage battery and the rated power of the energy storage system; where $N_d$ (t) is the maximum discharge power of the flywheel energy storage system at time t, $P_m$ is the rated power of the energy storage system, SOC is a current state of charge of the energy storage system, $SOC_{min}$ is a minimum state of charge allowed by the energy storage system, K, P, $P_0$, b and r are the first, second, third, fourth, and fifth characteristic parameters of a Logistic regression function respectively.

Embodiments of the present specification are described in a progressive manner, each embodiment focuses on the difference from other embodiments, and the same and similar parts between the embodiments may refer to each other.

Since the device disclosed in an embodiment corresponds to the method disclosed in another embodiment, the description is relatively simple, and reference can be made to the method description.

In this specification, some specific embodiments are used for illustration of the principles and implementations of the present disclosure. The description of the foregoing embodiments is configured to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as limitations to the present disclosure.

What is claimed is:

1. A thermal power unit-flywheel energy storage cooperative frequency regulation control method, comprising:
   obtaining a real-time operating parameter of a thermal power unit, a difference adjustment coefficient of a governor, a grid frequency deviation, a current state of charge of an energy storage battery and a rated power of an energy storage system;
   obtaining a predicted value of an output power increment of the thermal power unit by using a dynamic model of the thermal power unit according to the real-time operating parameter of the thermal power unit;
   determining an initial power instruction of a flywheel energy storage system according to the predicted value of the output power increment of the thermal power unit, the difference adjustment coefficient of the governor and the grid frequency deviation;
   obtaining a real-time maximum discharge power of the flywheel energy storage system by using a Logistic regression function according to the current state of charge of the energy storage battery and the rated power of the energy storage system;
   selecting a minimum value between the real-time maximum discharge power of the flywheel energy storage system and the initial power instruction of the flywheel energy storage system as a real-time frequency regulation power instruction of the flywheel energy storage system, and sending it to the flywheel energy storage system;
   determining a frequency regulation power instruction of the thermal power unit according to the difference adjustment coefficient of the governor and the grid frequency deviation, and sending it to the thermal power unit.

2. The method of claim 1, wherein the obtaining a predicted value of an output power increment of the thermal power unit by using a dynamic model of the thermal power unit according to the real-time operating parameter of the thermal power unit, comprises:
   building the dynamic model of the thermal power unit, wherein the dynamic model of the thermal power unit comprises a boiler dynamic model and a steam turbine dynamic model;
   obtaining a predicted value of a main steam flow increment by using a formula $$\Delta D_t = K_6 \left( \int u_t dp_t + \int p_t du_t \right) = K_6 \int \left( u_t \frac{dp_t}{dt} + p_t \frac{du_t}{dt} \right) dt$$

based on the boiler dynamic model and according to the real-time operating parameter of the thermal power unit, wherein $\Delta D_t$ is the predicted value of the main steam flow increment at time t, $K_6$ is an internal balance coefficient of a simulation model, $u_t$ is a valve opening at time t, $p_t$ is a main steam pressure of the thermal power unit at time t;
   inputting the predicted value of the main steam flow increment into the steam turbine dynamic model, and obtaining the predicted value of the output power increment of the thermal power unit by using a formula $$\Delta N_p = \frac{1 + s\lambda T_{RH} F_{HP} + s T_{RH} F_{HP}}{(1 + s T_{SC})(1 + s T_{RH})} \Delta D_t,$$

wherein $\Delta N_p$ is the predicted value of the output power increment of the thermal power unit, $\lambda$ is an over regulation coefficient of a high-pressure cylinder, $T_{RH}$ is a volume-time constant for medium-pressure steam, $F_{HP}$ is a power coefficient of the high-pressure cylinder, $T_{SC}$ is a volume-time constant for high-pressure steam, $T_{RH}$ is a volume-time constant for medium-pressure steam, and s is a Laplace operator.

3. The method of claim 2, wherein the determining an initial power instruction of a flywheel energy storage system according to the predicted value of the output power increment of the thermal power unit, the difference adjustment coefficient of the governor and the grid frequency deviation, comprises:
   determining a compensation amount of a flywheel to compensate for output loss of the thermal power unit by using a formula $$\Delta N = -\frac{1}{R} \Delta f - \Delta N_p$$

according to the predicted value of the output power increment of the thermal power unit, the difference adjustment coefficient of the governor and the grid frequency deviation, wherein $\Delta N$ is the compensation amount of the flywheel to compensate for the output loss of the thermal power unit, R is the difference adjustment coefficient of the governor, and $\Delta f$ is the grid frequency deviation;
   determining a droop control output of the flywheel as a function of the grid frequency deviation by using a formula $N_s = -K_f \Delta f$ according with the grid frequency deviation, wherein $N_s$ is the droop control output of the flywheel as a function of the grid frequency deviation, and $K_f$ is a droop control coefficient of the flywheel energy storage system;
   determining a sum of the compensation amount of the flywheel to compensate for the output loss of the thermal power unit and the droop control output of the flywheel as a function of the grid frequency deviation, as the initial power instruction of the flywheel energy storage system.

4. The method of claim 1, wherein the obtaining a real-time maximum discharge power of the flywheel energy storage system by using a Logistic regression function according to the current state of charge of the energy storage battery and the rated power of the energy storage system comprises:
   determining the real-time maximum discharge power of the flywheel energy storage system by using a formula $$N_d(t) = \frac{KP_m P \times e^{\frac{r \times (SOC-SOC_{min})}{b}}}{K + P_0 \times e^{\frac{r \times (SOC-SOC_{min})}{b}}}$$

according to the current state of charge of the energy storage battery and the rated power of the energy storage system,
wherein $N_d$ (t) is a maximum discharge power of the flywheel energy storage system at time t, $P_m$ is the rated power of the energy storage system, SOC is the current state of charge of the energy storage system, and $SOC_{min}$ is a minimum state of charge allowed by the energy storage system, K, P, $P_0$, b and r are a first characteristic parameter, a second characteristic parameter, a third characteristic parameter, a fourth characteristic parameter, and a fifth characteristic parameter of the Logistic regression function, respectively.

5. A thermal power unit unit-flywheel energy storage cooperative frequency regulation control system, comprising:
   a parameter obtaining module configured to obtain a real-time operating parameter of a thermal power unit, a difference adjustment coefficient of a governor, a grid frequency deviation, a current state of charge of an energy storage battery and a rated power of an energy storage system;
   an increment prediction module configured to obtain a predicted value of an output power increment of the thermal power unit by using a dynamic model of the thermal power unit according to the real-time operating parameter of the thermal power unit;
   an initial power instruction determining module configured to determine an initial power instruction of a flywheel energy storage system according to the predicted value of the output power increment of the thermal power unit, the difference adjustment coefficient of the governor and the grid frequency deviation;
   a real-time maximum discharge power obtaining module configured to obtain a real-time maximum discharge power of the flywheel energy storage system by using a Logistic regression function according to the current state of charge of the energy storage battery and the rated power of the energy storage system;
   a flywheel real-time frequency regulation power instruction sending module configured to select a minimum value between the real-time maximum discharge power of the flywheel energy storage system and the initial power instruction of the flywheel energy storage system as a real-time frequency regulation power instruction of the flywheel energy storage system, and send it to the flywheel energy storage system;
   a thermal power unit frequency regulation power instruction sending module configured to determine a frequency regulation power instruction of the thermal power unit according to the difference adjustment coefficient of the governor and the grid frequency deviation, and send it to the thermal power unit.

6. The system of claim 5, wherein the increment prediction module comprises:
   a thermal power unit dynamic model building submodule configured to build the dynamic model of the thermal power unit, wherein the dynamic model of the thermal power unit comprises a boiler dynamic model and a steam turbine dynamic model;
   a main steam flow increment predicted value obtaining sub-module configured to obtain a predicted value of a main steam flow increment by using a formula $$\Delta D_t = K_6 \left( \int u_t dp_t + \int p_t du_t \right) = K_6 \int \left( u_t \frac{dp_t}{dt} + p_t \frac{du_t}{dt} \right) dt$$

based on the boiler dynamic model and according to the real-time operating parameter of the thermal power unit, wherein $\Delta D_t$ is the predicted value of the main steam flow increment at time t, $K_6$ is an internal balance coefficient of a simulation model, $u_t$ is a valve opening at time t, $p_t$ is a main steam pressure of the thermal power unit at time t;
   a power increment prediction sub-module configured to input the predicted value of the main steam flow increment into the steam turbine dynamic model, and obtain the predicted value of the output power increment of the thermal power unit by using a formula $$\Delta N_p = \frac{1 + s\lambda T_{RH} F_{HP} + sT_{RH} F_{HP}}{(1 + sT_{SC})(1 + sT_{RH})} \Delta D_t,$$

wherein $\Delta N_p$ is the predicted value of the output power increment of the thermal power unit, $\lambda$ is an over regulation coefficient of a high-pressure cylinder, $T_{RH}$ is a volume-time constant for medium-pressure steam, $F_{HP}$ is a power coefficient of the high-pressure cylinder, $T_{SC}$ is a volume-time constant for high-pressure steam, $T_{RH}$ is a volume-time constant for medium-pressure steam, and s is a Laplace operator.

7. The system of claim 6, wherein the initial power instruction determining module comprises:
   a compensation amount determining sub-module configured to determine a compensation amount of a flywheel to compensate for output loss of the thermal power unit by using a formula $$\Delta N = -\frac{1}{R} \Delta f - \Delta N_p$$

according to the predicted value of the output power increment of the thermal power unit, the difference adjustment coefficient of the governor and the grid frequency deviation, wherein $\Delta N$ is the compensation amount of the flywheel to compensate for the output loss of the thermal power unit, R is the difference adjustment coefficient of the governor, and $\Delta f$ is the grid frequency deviation;
   a droop control output determining sub-module configured to determine a droop control output of the flywheel as a function of the grid frequency deviation by using a formula $N_s = -K_f \Delta f$ according with the grid frequency deviation, wherein $N_s$ s is the droop control output of the flywheel as a function of the grid frequency deviation, and $K_f$ is a droop control coefficient of the flywheel energy storage system;
   a summation sub-module configured to determine a sum of the compensation amount of the flywheel to compensate for the output loss of the thermal power unit and the droop control output of the flywheel as a function of the grid frequency deviation, as the initial power instruction of the flywheel energy storage system.

8. The system of claim 5, wherein the real-time maximum discharge power obtaining module comprises:
a real-time maximum discharge power determining sub-module configured to determine the real-time maximum discharge power of the flywheel energy storage system by using a formula $$N_d(t) = \frac{KP_m P \times e^{\frac{r \times (SOC - SOC_{min})}{b}}}{K + P_0 \times e^{\frac{r \times (SOC - SOC_{min})}{b}}},$$

according to the current state of charge of the energy storage battery and the rated power of the energy storage system;
wherein $N_d(t)$ is a maximum discharge power of the flywheel energy storage system at time t, $P_m$ is the rated power of the energy storage system, SOC is the current state of charge of the energy storage system, and $SOC_{min}$ is a minimum state of charge allowed by the energy storage system, K, P, $P_0$, b and r are a first characteristic parameter, a second characteristic parameter, a third characteristic parameter, a fourth characteristic parameter, and a fifth characteristic parameter of the Logistic regression function, respectively.

* * * * *